(12) United States Patent
Tango et al.

(10) Patent No.: US 10,735,083 B2
(45) Date of Patent: Aug. 4, 2020

(54) COMMUNICATION REPEATER DEVICE, CONTROL METHOD, AND COMPUTER PROGRAM PRODUCT

(71) Applicants: KABUSHIKI KAISHA TOSHIBA, Minato-ku (JP); TOSHIBA INFRASTRUCTURE SYSTEMS & SOLUTIONS CORPORATION, Kawasaki-shi (JP)

(72) Inventors: Toshihiro Tango, Kawasaki (JP); Katsumi Kusama, Minato-ku (JP); Yasutaka Iida, Minato-ku (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki-shi (JP)

(*) Notice: Subject to any disclaimer, the term of this patent is extended or adjusted under 35 U.S.C. 154(b) by 17 days.

(21) Appl. No.: 16/253,483

(22) Filed: Jan. 22, 2019

(65) Prior Publication Data

US 2019/0229798 A1 Jul. 25, 2019

(30) Foreign Application Priority Data

Jan. 25, 2018 (JP) .................................. 2018-010595

(51) Int. Cl.
| H04B 7/14 | (2006.01) |
| H04L 27/26 | (2006.01) |
| H04W 24/02 | (2009.01) |
| H04L 5/14 | (2006.01) |
| H04B 7/155 | (2006.01) |

(52) U.S. Cl.
CPC ............ *H04B 7/14* (2013.01); *H04B 7/15542* (2013.01); *H04L 5/14* (2013.01); *H04L 27/2605* (2013.01); *H04L 27/2666* (2013.01); *H04L 27/2678* (2013.01); *H04W 24/02* (2013.01)

(58) Field of Classification Search
None
See application file for complete search history.

(56) References Cited

U.S. PATENT DOCUMENTS

| 2007/0237181 A1 | 10/2007 | Cho et al. |
| 2009/0316611 A1 | 12/2009 | Stratford et al. |
| 2009/0318089 A1 | 12/2009 | Stratford et al. |

(Continued)

FOREIGN PATENT DOCUMENTS

| JP | 2003-264493 | 9/2003 |
| JP | 4435231 | 3/2010 |

(Continued)

*Primary Examiner* — Hong S Cho
(74) *Attorney, Agent, or Firm* — Oblon, McClelland, Maier & Neustadt, L.L.P.

(57) ABSTRACT

According to an embodiment, a communication repeater device includes storage and a controller which detects, upon receiving a radio frame including pairs of orthogonal frequency division multiplexing symbols and cyclic prefixes from the radio base station, switching timing between uplink and downlink according to similarity between certain sections of an original radio frame and a time-shifted radio frame. The controller estimates the subsequent switching timing between the uplink and the downlink from the detected switching timing and frame information stored in the storage.

6 Claims, 9 Drawing Sheets

(56) References Cited

U.S. PATENT DOCUMENTS

| | | | |
|---|---|---|---|
| 2016/0360500 A1 | 12/2016 | Kim et al. | |
| 2018/0054268 A1* | 2/2018 | Abdoli | H04J 11/0023 |
| 2018/0227870 A1 | 8/2018 | Kim et al. | |
| 2018/0337809 A1* | 11/2018 | Kishiyama | H04L 27/2607 |
| 2020/0021976 A1* | 1/2020 | Shimezawa | H04L 1/1858 |
| 2020/0083995 A1* | 3/2020 | Suzuki | H04L 27/2607 |

FOREIGN PATENT DOCUMENTS

| | | |
|---|---|---|
| JP | 2012-019409 | 1/2012 |
| JP | 2014-039149 | 2/2014 |
| JP | 5406924 | 2/2014 |
| JP | 5449344 | 3/2014 |
| JP | 2016-046776 | 4/2016 |
| JP | 2018-512012 | 4/2018 |

* cited by examiner

<FRAME INFORMATION>

| SETTING | SWITCH POINT PERIOD | SUB-FRAME NUMBER ||||||||||
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

COMMUNICATION REPEATER DEVICE, CONTROL METHOD, AND COMPUTER PROGRAM PRODUCT

CROSS-REFERENCE TO RELATED APPLICATIONS

This application is based upon and claims the benefit of priority from Japanese Patent Application No. 2018-010595, filed Jan. 25, 2019, the entire contents of which are incorporated herein by reference.

FIELD

An embodiment described herein relates generally to a communication repeater device, a control method, and a computer program product.

BACKGROUND

Conventionally, repeater (communication repeater devices) are known, which enable the use of mobile communication terminals such as smartphones and tablet terminals in buildings, underground shopping areas, and subway yards. For example, the repeaters relay communication between a radio base station adopting time division duplexing (TDD) and mobile communication terminals.

In TDD system, such a repeater needs to output radio signals in synchronization with radio signals from a base station located in the peripheral area. Upon receipt of a radio signal from the base station, the repeater extracts timing from the radio signal in order to output radio signals in synchronization with the radio signals from the base station. Then, the repeater controls the timing at which the radio signals received from the base station are retransmitted, in accordance with the extracted timing.

For example, the repeater detects the waveform of a downlink signal that is transmitted from the base station to detect the timing at which a detected level matches or exceeds a certain threshold value, as switching timing from an uplink to a downlink.

Detecting the downlink signal as above, however, makes it difficult to accurately estimate the switching timing from the uplink to the downlink due to differences in signal level characteristics among different radios at the time of signal rising.

An object of the present invention is to provide a communication repeater device, a control method, and a computer program product that enable accurate estimation of the switching timing between the uplink and the downlink.

DETAILED DESCRIPTION

A communication repeater device according to an embodiment relays communication between a radio base station adopting time division duplexing and a mobile communication terminal. The communication repeater device includes storage and a controller. The storage stores therein frame information representing allocation of a downlink, an uplink, and a guard period to a radio frame. The allocation is pre-defined by the time division duplexing. Upon receiving the radio frame from the radio base station, the controller detects switching timing between the uplink and the downlink according to similarity between certain sections of the original radio frame and a time-shifted radio frame. The radio frame includes pairs of orthogonal frequency division multiplexing symbols and cyclic prefixes. The controller estimates subsequent switching timing between the uplink and the downlink from the detected switching timing and the frame information stored in the storage.

With reference to the accompanying drawings, the following describes an exemplary embodiment of a communication repeater device, a control method, and a computer program product according to the present invention.

Figure 1:
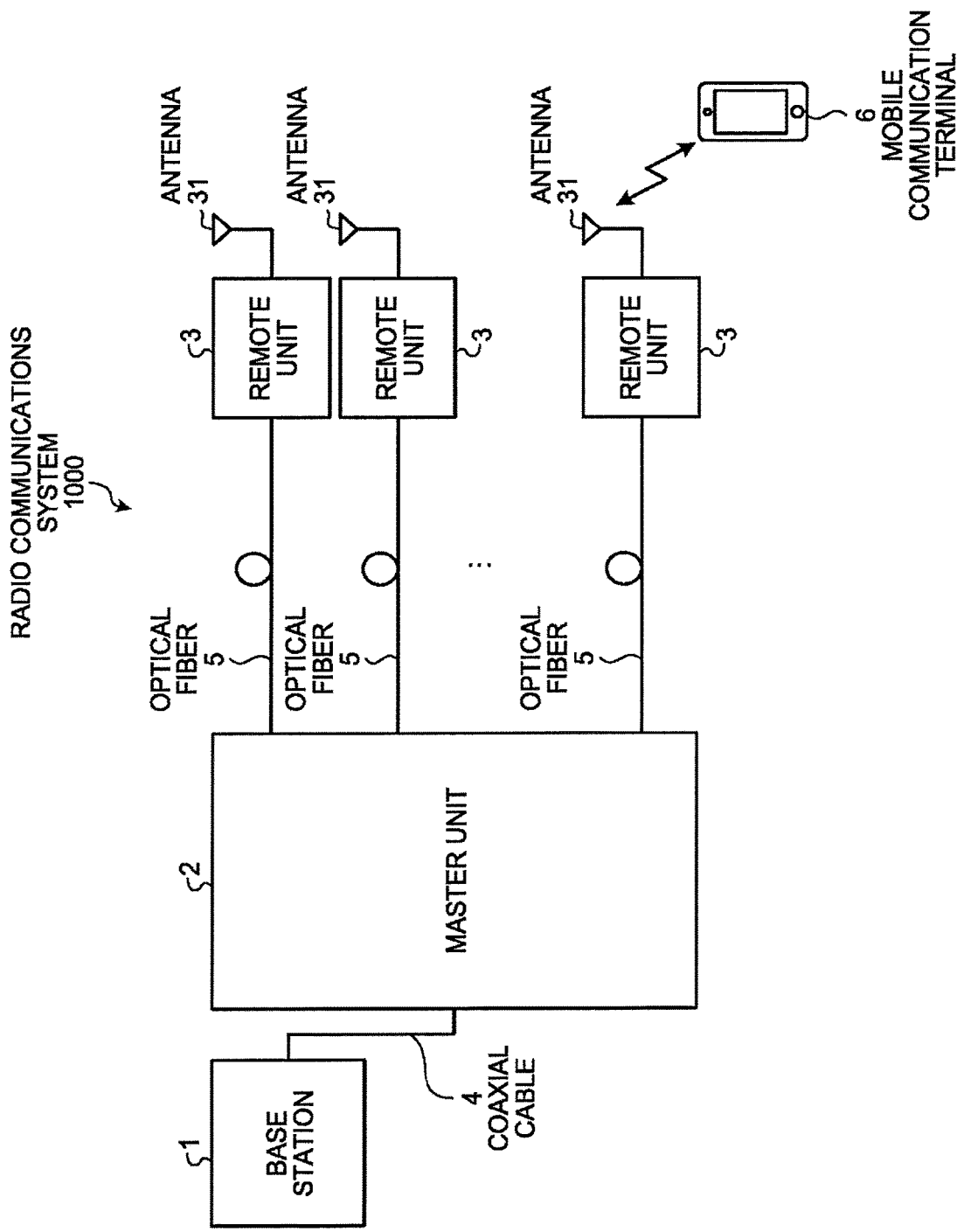
FIG. 1 is an overall configuration diagram of a radio communications system according to an embodiment.

With reference to FIG. 1, the overall configuration of a radio communications system 1000 of the embodiment will be described. FIG. 1 is an overall configuration diagram of the radio communications system 1000 of the embodiment. The radio communications system 1000 includes a base station 1 (radio base station) adopting a time division duplex (TDD) system, a master unit 2 (communication repeater device) connected to the base station 1 via a coaxial cable 4, and a plurality of remote units connected to the master unit 2 via optical fibers 5.

The master unit 2 and the remote units 3 are communication repeater devices that relay communication between the base station 1 and a mobile communication terminal 6 such as a smartphone or tablet device. That is, the master unit 2 and the remote units 3 work as a repeater that enables the use of the mobile communication terminal 6 in the dead zone where the radio signals from the base station 1 cannot or are hard to directly reach, such as a building, an underground shopping area, or a subway yard. The remote units 3 each include an antenna 31 for radio communication with the mobile communication terminal 6.

The base station 1 performs communication by the TDD system. The base station 1 generates a downlink signal in a radio frequency (RF) band and splits the generated downlink signal into two. The base station 1 outputs one of the downlink signals to the master unit 2 via the coaxial cable 4.

Figure 2:
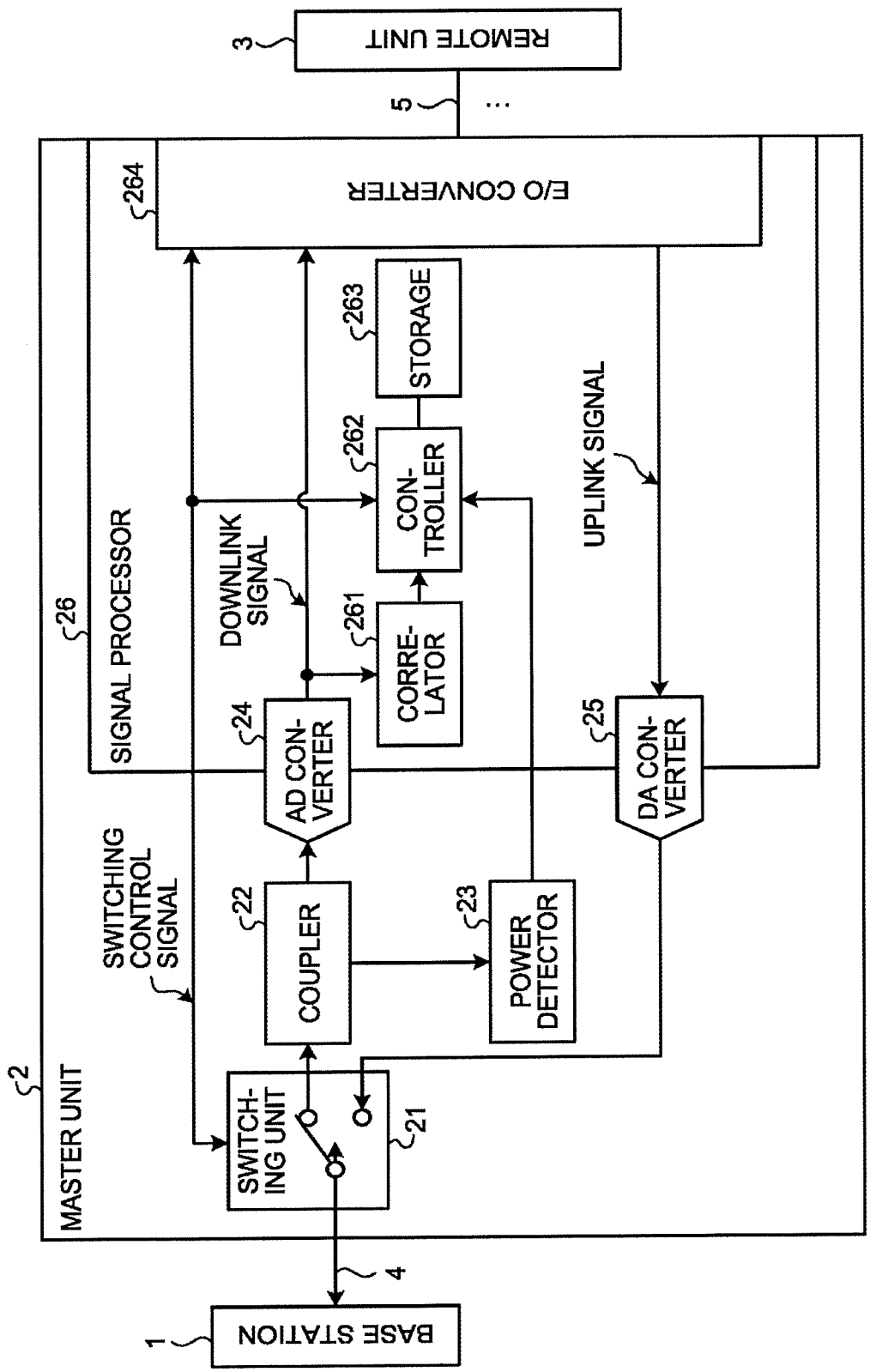
FIG. 2 is a configuration diagram of a master unit in the embodiment.

Next, with reference to FIG. 2, the configuration of the master unit 2 of the embodiment will be described. FIG. 2 is a configuration diagram of the master unit 2 in the embodiment. The master unit 2 includes a switch 21, a coupler 22, a power detector 23, an analog-to-digital (AD)

converter 24, a digital-to-analog (DA) converter 25, and signal processor 26. The signal processor 26 includes a correlator 261, a controller 262, a storage 263, and a E/O converter 264. The signal processor 26 is implemented by software and a field-programmable gate array (FPGA), for example.

The switch 21 is connected to the base station 1 at one end, and switchably connected at the other end to either a downlink communication channel to the coupler 22 or an uplink communication channel to the PA converter 25. Specifically, the switch 21 receives a downlink signal from the base station 1 via the coaxial cable 4 and an uplink signal from the E/O converter 264 via the DA converter 25. The switch 21 further receives a switching control signal generated by the controller 262 of the signal processor 26, and switches the communication channels in accordance with the switching control signal. That is, the switch 21 switches, in accordance with the switching control signal, between the paths for output of the downlink signal to the E/O converter 264 via the AD converter 24 and for output of the uplink signal to the base station 1 via the coaxial cable 4. The coupler 22 bifurcates a transmission signal of the downlink communication channel into two.

The power detector 23 receives the downlink signal from the coupler 22 and detects (for example, envelope detection) the waveform thereof. The power detector 23 outputs the detected envelope signal to the controller 262 via a low-pass filter (not depicted), for example.

The AD converter 24 receives the downlink signal from the coupler 22 and converts it into a digital signal for output to the correlator 261 (as will be described in detail later) and the E/O converter 264.

The E/O converter 264 performs electro-optic conversion on the downlink signal supplied from the AD converter 24 and outputs an optical signal to the remote units 3 via the optical fibers 5. The E/O converter 264 further performs photoelectric conversion on the uplink signal supplied from the remote units 3 and outputs the uplink signal to the DA converter 25.

The storage 263 stores therein frame information (as will be described in detail later) representing allocation of a downlink, an uplink, and a guard period to a radio frame, which is pre-defined by the TDD system. The controller 262 performs various control, as will be described in detail later.

Figure 3:
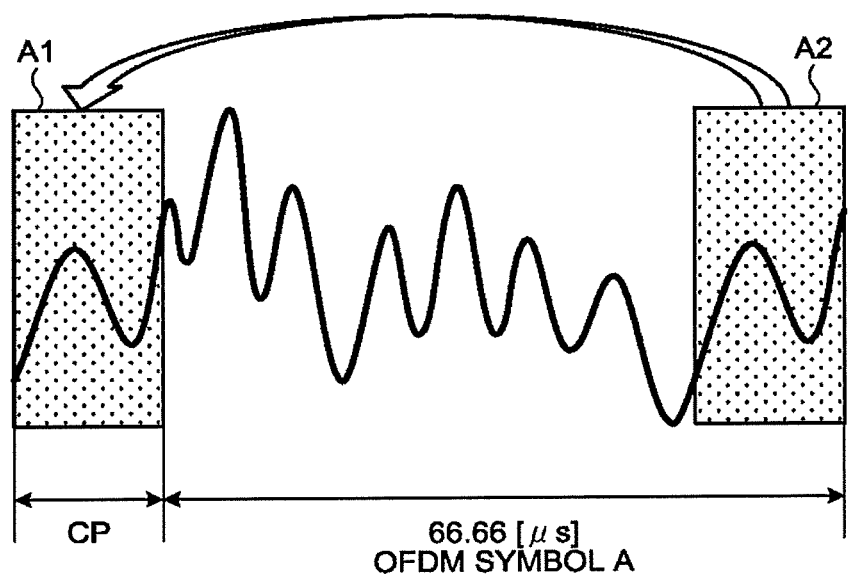
FIG. 3 is an explanatory diagram of a cyclic prefix in the embodiment.

Next, with reference to FIG. 3, a cyclic prefix (CP) of the embodiment will be described. FIG. 3 is an explanatory diagram of the CP in the embodiment. In orthogonal frequency division multiplexing (OFDM), part (denoted by A2) of the end of one OFDM symbol (66.66 µs in length, denoted by A) is copied to generate a CP (denoted by A1) to add the CP to the head of the OFDM symbol, mainly aiming for multi-path prevention. That is, the OFDM system employs a pair of an OFDM symbol and a CP as a radio frame. Such a radio frame is transmitted from the base station 1 to the master unit 2, for example. The copying as above is not indispensable as long as part of the OFDM symbol matches with the CP, for example.

Figure 4:
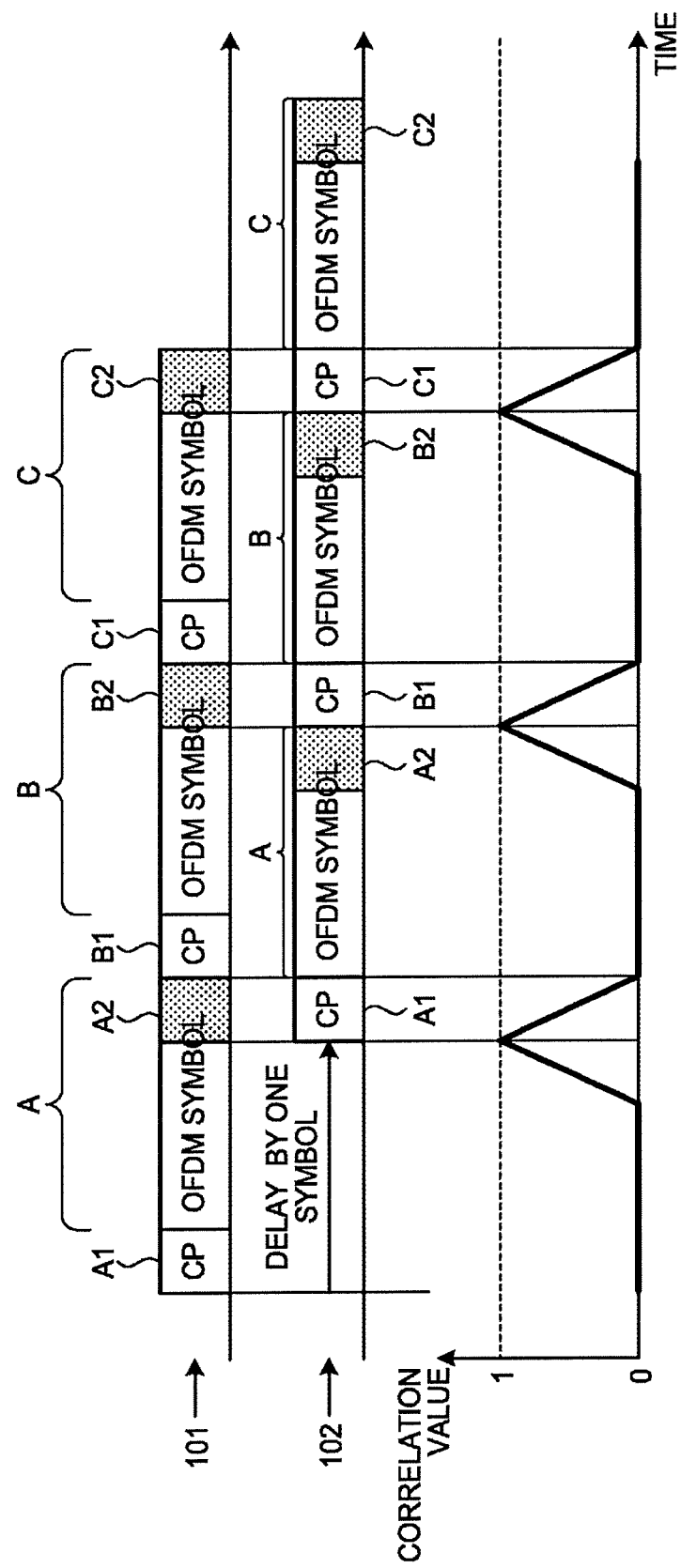
FIG. 4 is an explanatory diagram of a correlation value of a radio signal in the embodiment.

FIG. 4 is an explanatory diagram of a correlation value (autocorrelation value, correlation coefficient) of a radio signal in the embodiment. The correlator 261 of the master unit 2 calculates the correlation value from the downlink signal received via the AD converter 24. An original, i.e., not time-shifted radio frame 101 includes a pair of an OFDM symbol A including an A2 part and a CP A1, a pair of an OFDM symbol B including a B2 part and a CP B1, and a pair of an OFDM symbol C including a C2 part and a CP C1.

A radio frame 102 corresponds the time-shifted radio frame. Consider the correlation value (autocorrelation value) that represents exemplary similarity between certain sections (of the same length as the CP, for example) of the radio frame 101 and the radio frame 102. The correlation value illustrated in bottom of FIG. 4 represents change in the correlation from a certain time point to a time point after a time corresponding to the certain section elapses from the certain time point.

At the time when the radio frame 102 is slightly shifted from the radio frame 101, there is almost no similarity of data in the certain sections, and the correlation value is substantially zero. At the time when the radio frame 102 is shifted by the length of one OFDM symbol from the radio frame 101, the data in the A1 part of the radio frame 102 and the data in the A2 part of the radio frame 101 match each other, and the correlation value is one (slightly smaller than one, considering noise). The controller 262 of the master unit 2 uses such characteristics to be able to detect the switching timing between the uplink and the downlink from the correlation value received from the correlator 261 (as will be described in detail later).

Figures 5, 6:
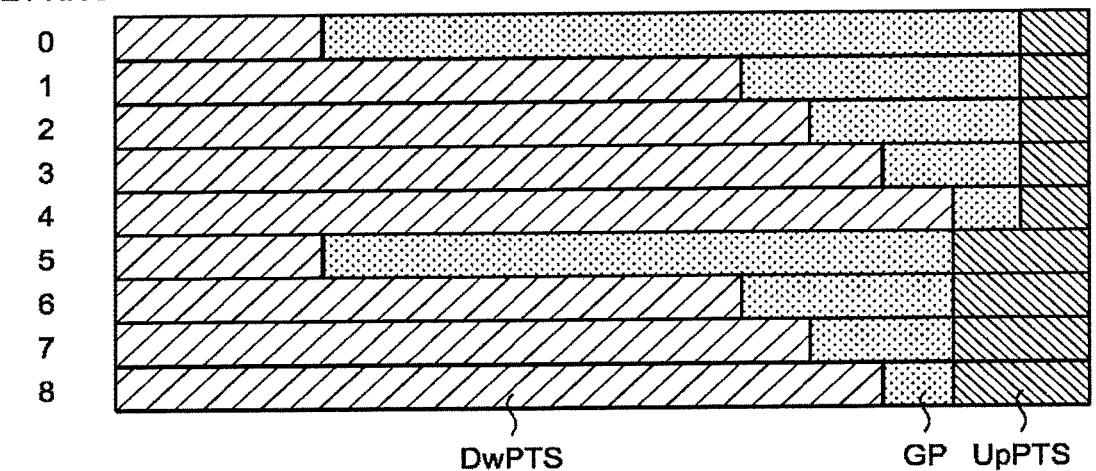
FIG. 5 is a diagram illustrating frame information in the embodiment.
FIG. 6 is a diagram illustrating special sub-frame information in the embodiment.

Next, with reference to FIG. 5, the frame information stored in the storage 263 will be described. FIG. 5 is a diagram illustrating the frame information in the embodiment. In TD-LTE system, which refers to a long-term evolution (LTE) radio communication using TDD system, the allocation of a downlink, an uplink, and a Guard period to a radio frame are defined by third generation partnership project (3GPP), for instance. The frame information represents such allocation information.

As illustrated in FIG. 5, the frame information contains switch point periods and sub-frame numbers in settings 0 to 6, in association with each other. In the sub-frame numbers, "D" represents a downlink sub-frame, "U" represents an uplink sub-frame, and "S" represents a special sub-frame.

The special sub-frame has patterns, as illustrated in FIG. 6. FIG. 6 is a diagram illustrating special sub-frame information in the embodiment. In FIG. 6, "DwPTS" represents a downlink pilot time slot, "GP" represents a guard period, and "UpPTS" represents an uplink pilot time slot. The special sub-frame information contains the allocation of "DwPTS", "GP", and "UpPTS" in settings 0 to 8 as illustrated in FIG. 6.

The devices such as the master unit stores the settings (0 to 6) of the frame information (FIG. 5) corresponding to the radio frame for use in the communication and the settings (0 to 8) of the special sub-frame information (FIG. 6). Upon once detecting switching timing between the uplink and the downlink (hereinafter also simply referred to as switching timing) according to the correlation value, the master unit 2 can accurately estimate the subsequent switching timing between the uplink and the downlink from the detected switching timing and the stored frame information (including the special sub-frame information).

Figure 7:
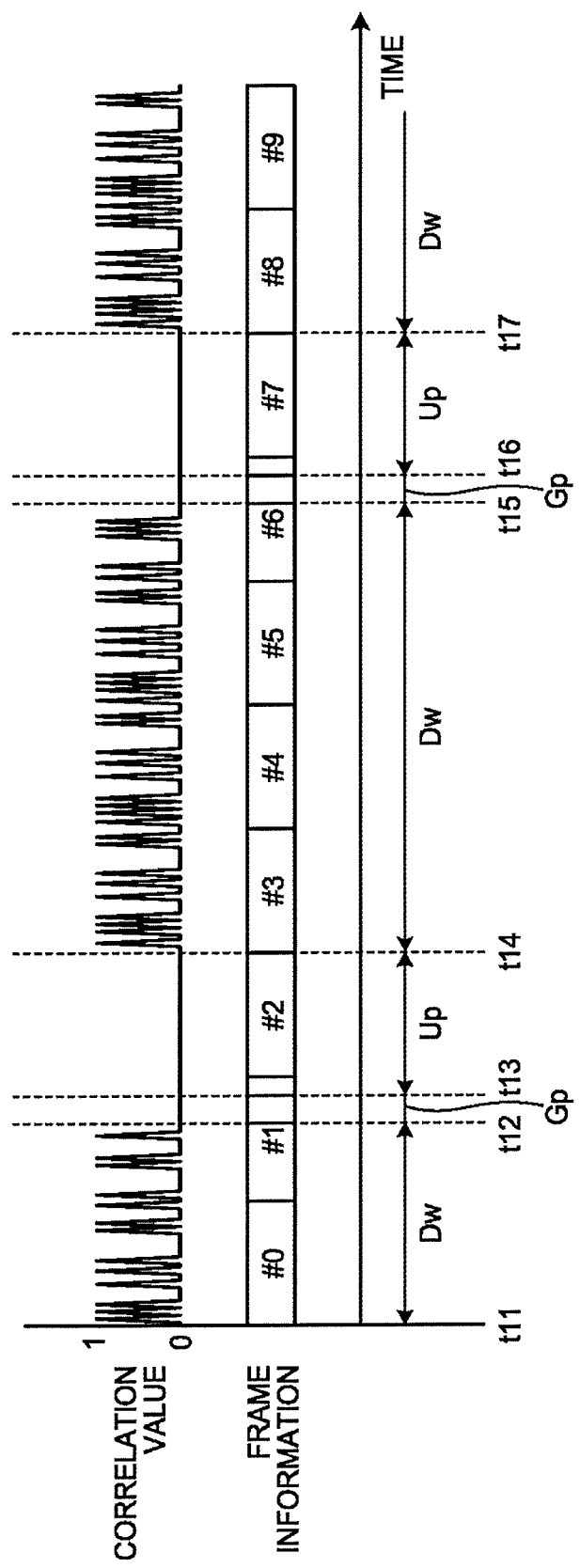
FIG. 7 is a diagram illustrating relationship between the frame information and the correlation value in the embodiment.

FIG. 7 is a diagram illustrating relationship between the frame information and the correlation value in the embodiment. FIG. 7 shows the relationship in the setting "2" of the frame information (FIG. 5) corresponding to the radio frame for use in the communication and the setting "6" of the special sub-frame information (FIG. 6). In FIG. 7, the symbols "#0" to "#9" in the sub-frame information represent the sub-frame numbers.

As illustrated in FIG. 7, in the period from t11 and t12, from t14 to t15, and after t17 being the downlink (Dw), the correlation value frequently repeats falling and rising between "0" and "1". During the uplink (Up) period and the guard period (GP) other than the above period, the correlation value remains zero because of no signal monitoring.

Thus, the controller 262 of the master unit 2 can continuously acquire the correlation values from the correlator 261, to thereby recognize the end of the downlink at time t12 and start of the downlink, that is, switching from the uplink to the downlink at time t14, for example.

That is, when receiving the radio frame from the base station 1, the controller 262 of the master unit 2 detects switching timing between the uplink and the downlink on the basis of the similarity (the correlation value calculated by the correlator 261) between certain sections of the original radio frame and the time-shifted radio frame. The controller 262 can accurately estimate the subsequent switching timing between the uplink and the downlink from the detected switching timing and the frame information (including the special sub-frame information) stored in the storage 263. Then, the controller 262 can control the switch (FIG. 2) through the switching control signal to switch the signal paths, and control the remote units 3 via the E/O converter 264 to switch between the uplink and the downlink at the estimated switching timing.

The value indicative of the similarity can be a certain value that a calculator (not depicted) of the signal processor 26 calculates by convolution integration, in place of the correlation value calculated by the correlator 261.

Figure 8:
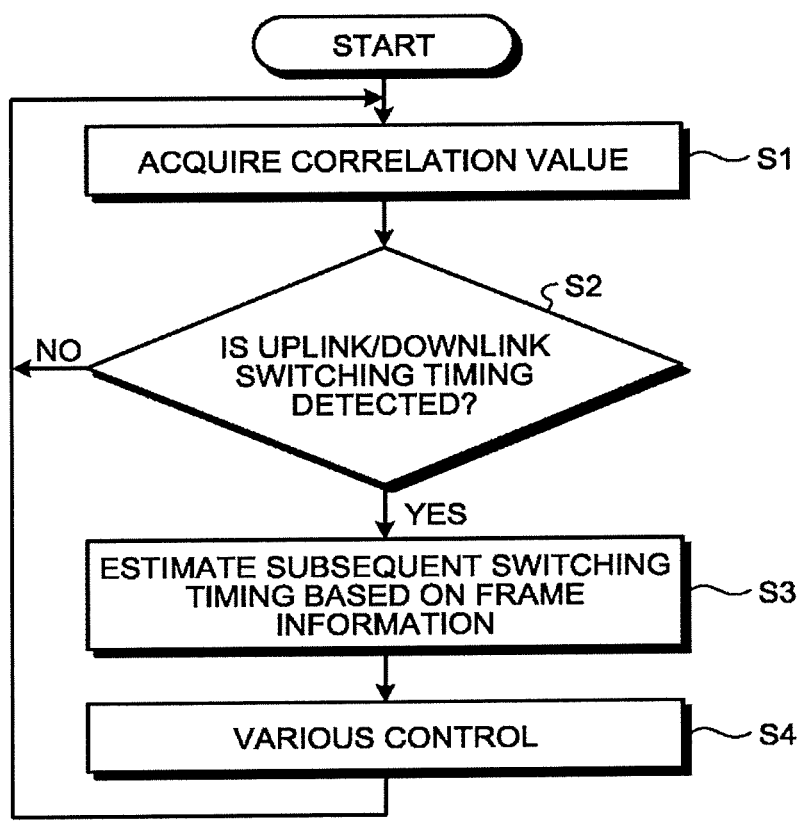
FIG. 8 is a flowchart illustrating first processing performed by the master unit in the embodiment.

Next, with reference to FIG. 8, first processing performed by the master unit 2 in the embodiment will be described. FIG. 8 is a flowchart illustrating the first processing performed by the master unit 2 in the embodiment.

At Step S1, the controller 262 of the master unit 2 acquires the correlation value from the correlator 261. At Step S2, the controller 262 determines whether to have detected the switching timing between the uplink and the downlink. With Yes, the controller 262 proceeds to Step S3, and with No, the controller 262 returns to Step S1.

At Step S3, the controller 262 estimates the subsequent switching timing between the uplink and the downlink from the switching timing detected at Step S2 and the frame information stored in the storage 263.

At Step S4, the controller 262 performs, at the estimated switching timing at Step S3, various control including the control of the switch 21 (FIG. 2) by the switching control signal and the control of the remote units 3 via the E/O converter 264 to switch between the uplink and the downlink. After Step S4, the controller 262 returns to Step S1.

Thus, through the first processing, the master unit 2 of the embodiment can detect the switching timing between the uplink and the downlink in accordance with the correlation value, and accurately estimate the subsequent switching timing between the uplink and the downlink from the detected switching timing and the frame information (including the special sub-frame information).

Meanwhile, there is an exemplary conventional method, as follows. While a repeater receives a radio signal from a base station, the radio signal may be variously affected by interference waves, phasing, and multipath in the propagation space. The repeater needs to demodulate the radio signal in order to accurately extract the switching timing between the uplink and the downlink from the received radio signal. In such a case, the repeater needs to incorporate an expensive demodulation integrated circuit (IC). To the contrary, the communication repeater device of the present embodiment does not require such a demodulation IC, enabling cost reduction.

As compared with the above conventional repeater that detects the switching timing from the uplink to the downlink by the waveform-detection, the communication repeater device of the present embodiment can accurately estimate the switching timing between the uplink and the downlink irrespective of differences in signal level characteristics of different radios at the time of signal rising.

Figure 10:
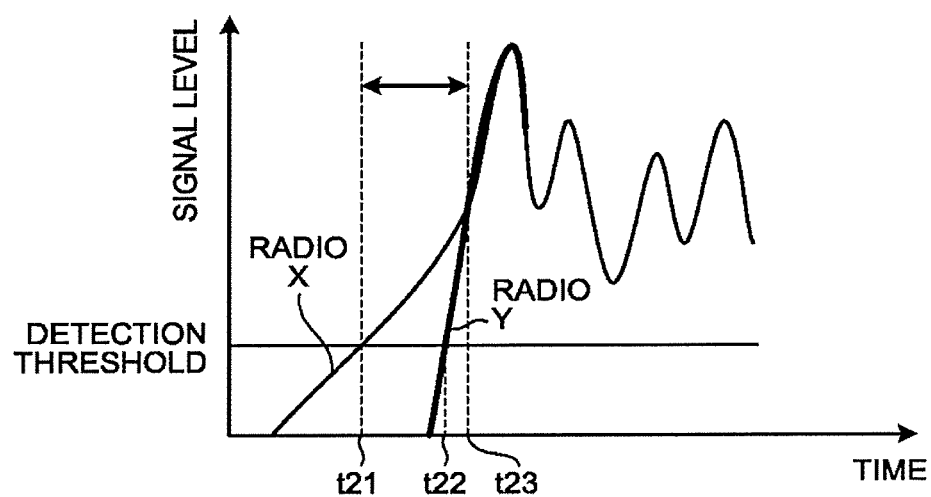
FIG. 10 is a graph illustrating difference in signal level characteristics between different radios at the time of signal rising in the embodiment.

FIG. 10 is a graph illustrating differences in signal level characteristics between different radios at the time of signal rising in the embodiment. As illustrated in FIG. 10, a radio X and a radio Y differ in signal level characteristics during signal rising. For example, in the case of adjusting the levels of signals of both the radios X and Y along the time axis to match each other after time t23, the signal level of the radio X exceeds a detection threshold at time t21 while the signal level of the radio Y exceeds the detection threshold at time t22.

Thus, such method has disadvantage that it is not possible to determine the switching timing from the uplink to the downlink for different radios by the same processing. Such disadvantage is irrelevant to the communication repeater device according to the present embodiment.

Figure 9:
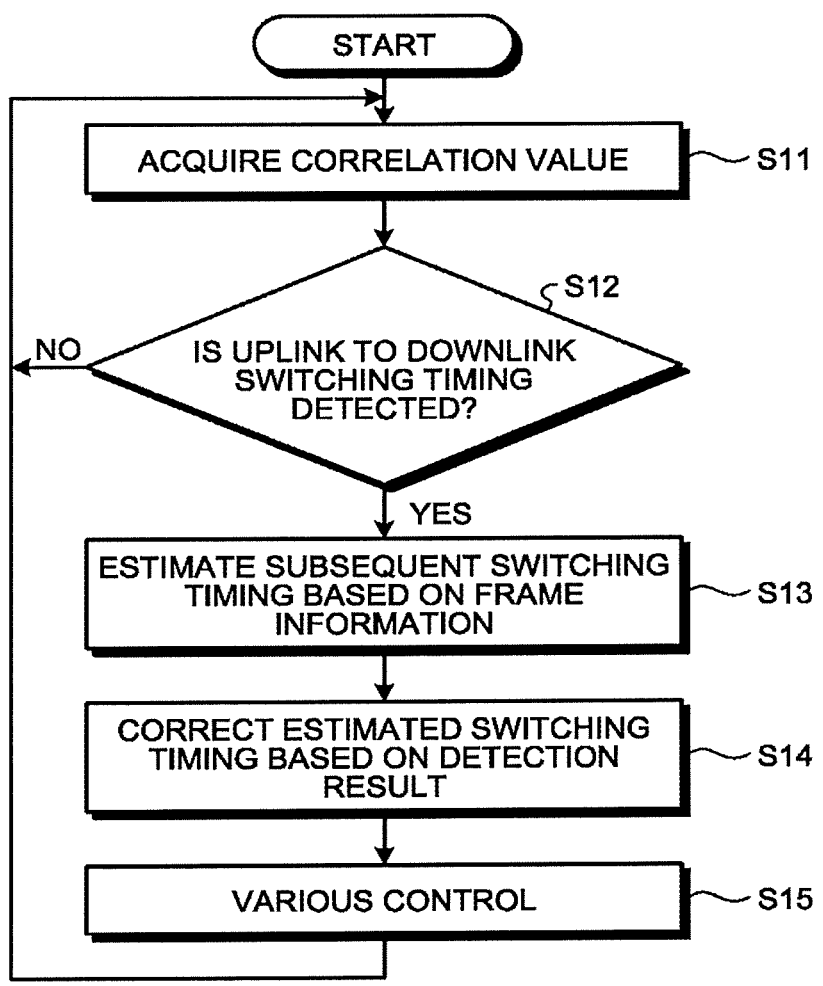
FIG. 9 is a flowchart illustrating second processing performed by the master unit in the embodiment.

Next, with reference to FIG. 9, second processing performed by the master unit 2 in the embodiment will be described. FIG. 9 is a flowchart illustrating the second processing performed by the master unit 2 in the embodiment.

At Step S11, the controller 262 of the master unit 2 acquires the correlation value from the correlator 261. At Step S12, the controller 262 determines whether to have detected the switching timing from the uplink to the downlink. With Yes, the controller 262 proceeds to Step S13, and with No, the controller 262 returns to Step S11.

At Step S13, the controller 262 estimates the subsequent switching timing between the uplink and the downlink from the switching timing detected at Step S12 and the frame information stored in the storage 263.

At Step S14, the controller 262 corrects the estimated switching timing at Step S13 in accordance with a result of the detection of the downlink signal by the power detector 23.

At Step S15, the controller 262 performs, at the corrected, estimated switching timing at Step S14, various control including the control of the switch 21 (FIG. 2) by the switching control signal, and the control of the remote units 3 via the E/O converter 264 to switch between the uplink and the downlink. After Step S15, the controller 262 returns to Step S11.

Thus, through the second processing, the master unit 2 in the embodiment can further improve the accuracy of estimates of the switching timing between the uplink and the downlink, additionally using the result of detection by the power detector 23, than through the first processing.

In the second processing, the estimated switching timing is corrected in accordance with the result of detection by the power detector 23. Alternatively, in reverse order, switching timing may be roughly estimated from the detection result by the power detector 23, to correct the estimated switching timing according to the correlation value.

While certain embodiments have been described, these embodiments have been presented by way of example only, and are not intended to limit the scope of the inventions. Indeed, the novel embodiments described herein may be embodied in a variety of other forms; furthermore, various omissions, substitutions, combinations, and changes in the form of the embodiments described herein may be made without departing from the spirit of the inventions. The accompanying claims and their equivalents are intended to cover such forms or modifications as would fall within the scope and spirit of the inventions.

The computer programs executed by the master unit 2 of the present embodiment can be recorded in installable or executable file format on a computer-readable recording medium such as a compact-disc read only memory (CD-ROM), a flexible disk (FD), a CD-recordable (CD-R), and a digital versatile disc (DVD). The computer programs executed by the master unit 2 of the present embodiment may be provided or distributed via a network such as the Internet.

What is claimed is:

1. A communication repeater device that relays communication between a radio base station adopting time division duplexing and a mobile communication terminal, the communication repeater device comprising:
    storage that stores therein frame information representing allocation of a downlink, an uplink, and a guard period to a radio frame, the allocation being pre-defined by the time division duplexing; and
    a controller that
        detects, upon receiving the radio frame from the radio base station, switching timing between the uplink and the downlink according to similarity between certain sections of an original radio frame and a time-shifted radio frame, the radio frame including pairs of orthogonal frequency division multiplexing symbols and cyclic prefixes, and
        estimates subsequent switching timing between the uplink and the downlink from the detected switching timing and the frame information stored in the storage.

2. The communication repeater device according to claim 1, further comprising
    a power detector that detects waveform of a downlink signal supplied via a cable from the radio base station, wherein
    the controller estimates the switching timing, additionally using a result of the detection of the downlink signal by the power detector.

3. The communication repeater device according to claim 1, further comprising
    a calculator that calculates, upon receiving the radio frame including the pairs from the radio base station, a value indicative of similarity between the certain sections of the original radio frame and the time-shifted radio frame by convolution integration, wherein
    the controller estimates the switching timing from the value indicative of the similarity calculated by the calculator.

4. The communication repeater device according to claim 1, further comprising
    a calculator that calculates, upon receiving the radio frame including the pairs from the radio base station, a value indicative of similarity between certain sections of the original radio frame and the time-shifted radio frame, using a correlation coefficient, wherein
    the controller estimates the switching timing from the value indicative of the similarity calculated by the calculator.

5. A control method to be executed by a communication repeater device that relays communication between a radio base station adopting time division duplexing and a mobile communication terminal, the communication repeater device including storage that stores therein frame information representing allocation of a downlink, an uplink, and a guard period to a radio frame, the allocation being pre-defined by the time division duplexing, the control method comprising:
    detecting, upon receiving the radio frame from the radio base station, switching timing between the uplink and the downlink according to similarity between certain sections of an original radio frame and a time-shifted radio frame, the radio frame including pairs of orthogonal frequency division multiplexing symbols and cyclic prefixes; and
    estimating subsequent switching timing between the uplink and the downlink from the detected switching timing and the frame information stored in the storage.

6. A computer program product including a non-transitory computer readable recording medium storing programmed instructions to be executed by a communication repeater device that relays communication between a radio base station adopting time division duplexing and a mobile communication terminal, the communication repeater device including storage that stores therein frame information representing allocation of a downlink, an uplink, and a guard period to a radio frame, the allocation being pre-defined by the time division duplexing, wherein the instructions, when executed, cause the communication repeater device to perform:
    detecting, upon receiving the radio frame from the radio base station, switching timing between the uplink and the downlink according to similarity between certain sections of an original radio frame and a time-shifted radio frame, the radio frame including pairs of orthogonal frequency division multiplexing symbols and cyclic prefixes; and
    estimating subsequent switching timing between the uplink and the downlink from the detected switching timing and the frame information, stored in the storage.

* * * * *